(12) United States Patent
Di Corpo

(10) Patent No.: US 11,800,315 B2
(45) Date of Patent: Oct. 24, 2023

(54) METHODS AND DEVICES FOR MONITORING FACILITIES

(71) Applicant: LES CONSEILLERS EN INFORMATIQUE IEG INC./IEG DATA PROCESSING CONSULTANTS INC., Montréal (CA)

(72) Inventor: Michael Di Corpo, Montréal (CA)

(73) Assignee: LES CONSEILLERS EN INFORMATIQUE IEG INC./IEG DATA PROCESSING CONSULTANTS INC., Montréal (CA)

(*) Notice: Subject to any disclaimer, the term of this patent is extended or adjusted under 35 U.S.C. 154(b) by 226 days.

(21) Appl. No.: 17/251,189

(22) PCT Filed: Jun. 20, 2019

(86) PCT No.: PCT/CA2019/050865
§ 371 (c)(1),
(2) Date: Dec. 10, 2020

(87) PCT Pub. No.: WO2019/241890
PCT Pub. Date: Dec. 26, 2019

(65) Prior Publication Data
US 2021/0368288 A1    Nov. 25, 2021

Related U.S. Application Data

(60) Provisional application No. 62/688,847, filed on Jun. 22, 2018.

(51) Int. Cl.
*H04W 4/021*  (2018.01)
*H04W 4/029*  (2018.01)
*G07C 9/28*   (2020.01)

(52) U.S. Cl.
CPC ........ *H04W 4/021* (2013.01); *G07C 9/28* (2020.01); *H04W 4/029* (2018.02)

(58) Field of Classification Search
CPC ........ H04W 4/021; H04W 4/029; G07C 9/28
See application file for complete search history.

(56) References Cited

U.S. PATENT DOCUMENTS

| 8,806,593 B1* | 8/2014 | Raphel ............ H04L 63/0892 726/6 |
| 9,665,998 B1 | 5/2017 | Shields et al. |
| 11,416,958 B1* | 8/2022 | Reichert ............ H04W 4/029 |
| 2014/0308977 A1 | 10/2014 | Cheung et al. |
| 2015/0181382 A1 | 6/2015 | McDonald et al. |

(Continued)

FOREIGN PATENT DOCUMENTS

| CA | 2859365 | 6/2014 |
| CA | 3021390 | 10/2017 |

*Primary Examiner* — Orlando Bousono
(74) *Attorney, Agent, or Firm* — Bereskin & Parr LLP/S.E.N.C.R.L., s.r.l.

(57) ABSTRACT

A method of monitoring access to a lounge is provided herein. The method includes identifying a user using a device and determining an assigned location associated with the user. The method also includes determining a current location associated with the user and comparing the assigned location and the current location. If the comparison is valid, the method further includes determining a geofence associated with the user and the device, and monitoring whether the device is within the geofence.

6 Claims, 16 Drawing Sheets

(56) References Cited

U.S. PATENT DOCUMENTS

| | | |
|---|---|---|
| 2015/0286984 A1 | 10/2015 | Dikman et al. |
| 2018/0033244 A1* | 2/2018 | Northrup ............. G08G 1/0175 |
| 2018/0122022 A1* | 5/2018 | Kelly ................. G06Q 30/0633 |
| 2018/0124564 A1* | 5/2018 | Phillips ............. G08B 21/0261 |
| 2018/0197163 A1* | 7/2018 | Kelly .................. G07F 17/0071 |
| 2018/0253805 A1* | 9/2018 | Kelly .................. G06Q 20/385 |

* cited by examiner

USE POS machine for Payment

Authorization Code

Proceed

Cancel

US 11,800,315 B2

METHODS AND DEVICES FOR MONITORING FACILITIES

CROSS-REFERENCE TO RELATED APPLICATIONS

The present application is a 35 USC 371 national stage entry of PCT/CA2019/050865 filed on Jun. 22, 2019 and which claims priority to U.S. provisional application No. 62/688,847 filed on Jun. 22, 2018. These documents are hereby incorporated by reference in its their entirety.

FIELD OF THE DISCLOSURE

The present disclosure relates to methods and devices for monitoring access to venues, such as airport lounges. In particular, the present disclosure relates to methods and devices for monitoring access and providing services to lounges.

BACKGROUND OF THE DISCLOSURE

Airports can be hostile environments. Large numbers of people pass through airports every day. This presents potential security threats as airports can be targets for terrorist attacks and other forms of crime because of the number of people located in one place. Usually, after being herded through long security lines and patted down, travelers have to face crowded gate areas. As a result of this, some of the travelers may head to airport lounges.

An airport lounge can offer travelers a quiet area to wait for their flights. For example, a lounge can offer comfortable seating, food, drinks (an open bar of alcoholic beverages, etc.), free newspapers and magazines, free Wi-Fi, etc. For example, travelers may use a lounge to take a quick nap or get some work done.

As security is always a concern inside the airport, owners of lounges have a need to implement sound security and access policies. As lounges are usually available to paying customers, lounge owners have a need for controlling, supervising, regulating or restricting entry to the lounge. At the same time, a lounge owner also has an interest in controlling or monitoring the behavior of persons inside the lounge, including travelers and employees.

For example, there is a need to control access to lounges, monitor who is giving access to lounges, and move staff inside the lounge (for example, between bars). For example, there is a need to keep records of all travelers in the lounges. For example, there is a need to keep records of all staff members in the lounges, especially when staff members change positions.

Once, inside a lounge, travelers need to know how to get around. At the same time, personnel inside the lounge may need to know information about the travelers. For example, personnel may need to know whether the passport or ID card a passenger gives him/her is valid. For example, personnel may need to know that a passenger is authorized to enter priority facilities, such as a first class lounge. For example, personnel may need to know that a passenger who checked-in online is going to the right departure gate. For example, personnel may need to know that a traveler has booked services inside the lounge. For example, such services may include pay walk-in, request for hot and/or cold meals, spa and massage services, showers, shoe shine, a nap suite with soft music, etc.

SUMMARY OF THE DISCLOSURE

It would thus be highly desirable to be provided with an apparatus or method that would at least partially solve one of the problems mentioned or that would be an alternative to the existing technologies According to one aspect, there is provided a method of monitoring access to a lounge includes: identifying a user using a device; determining an assigned location associated with the user; determining a current location associated with the user; comparing the assigned location and the current location; determining a geofence associated with the user and the device; and monitoring whether the device is within the geofence.

According to one aspect, there is provided a method of matching a user and one or more contacts in a lounge, including: determining whether the user is in the lounge; identifying the one or more contacts associated with the user; determining whether the one or more contacts are in the lounge; and alerting the user when the one or more contacts are in the lounge.

According to one aspect, there is disclosed a device for monitoring access to a lounge within a facility, including:
a communication interface for receiving and transmitting indoor maps of a facility from a communication network;
one or more user interfaces for receiving user input and providing indication to the user;
a memory; and a processor operatively coupled to the memory, the one or more user interfaces, and the communication interface, the processor being configured for:
providing an indoor map comprising at least one geofence;
identifying a person of interest;
determining an assigned geofence associated with the person of interest on the map; and determining whether the person of interest is authorized to enter or to be within the assigned geofence.

According to one aspect, there is provided a method for monitoring access to a lounge within a facility, including: providing, on a user device, an indoor map of the facility, the map comprising at least one geofence; identifying, at the user device, a person of interest; determining an assigned geofence associated with the person of interest on the map; and determining whether the person of interest is authorized to enter or to be within the assigned geofence.

A device for matching a user and at least one contact in a geofence of a facility, including:
a communication interface for receiving and transmitting indoor maps of a facility from a communication network;
one or more user interfaces for receiving user input and providing indication to the user;
a memory; and
a processor operatively coupled to the memory, the one or more user interfaces, and the communication interface, the processor being configured for:
providing an indoor map of the facility, the map comprising at least one geofence;
determining whether the user is within an assigned geofence; identifying at least one contact associated with the user;
determining whether the least one contact is within the assigned geofence; and
matching the user to the at least one contact when the user and the least one contact are within the boundaries of the assigned geofence.

According to one aspect, there is disclosed a method of matching a user and at least one contact in a geofence of a facility, including: providing, on a user device, an indoor map of the facility, the map comprising at least one geofence; determining, on the user device, whether the user is within an assigned geofence; identifying at least one contact associated with the user; determining whether the least one contact is within the assigned geofence; and matching the user to the at least one contact when the user and the least one contact are within the boundaries of the assigned geofence.

BRIEF DESCRIPTION OF THE DRAWINGS

The following drawings represent examples that are presented in a non-limitative manner.

DETAILED DESCRIPTION OF THE DISCLOSURE

Figure 1:
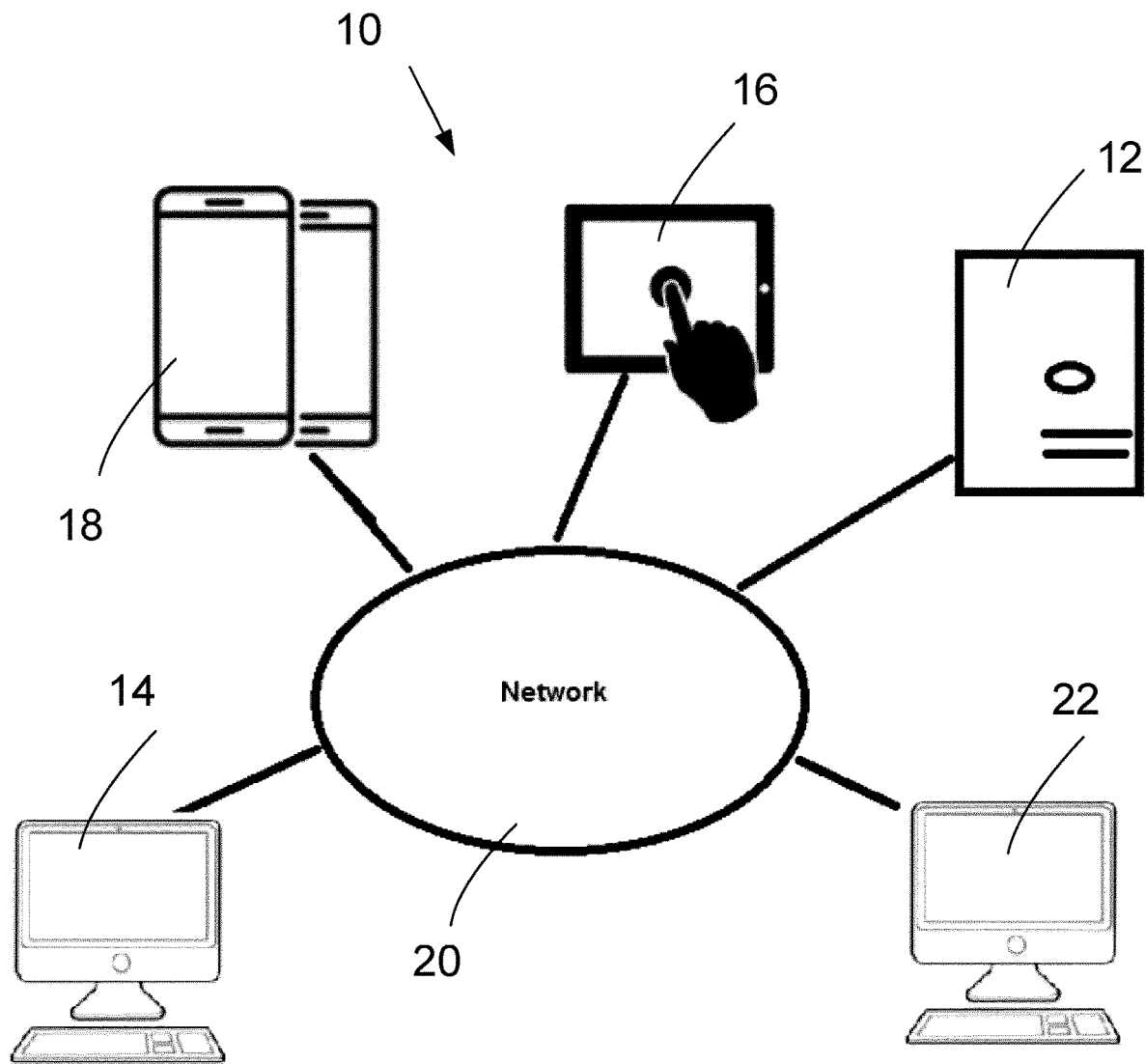
FIG. 1 illustrates a block diagram for a system for monitoring access to a facility according to one example.

For example, the current location includes one of: a physical location, a group gathering center, a store, a lounge.

For example, the method described herein involves determining one or more access/business rules associated with the current location.

For example, the method described herein involves identifying the user by scanning a boarding pass or loyalty membership card of the user.

For example, the method described herein involves determining whether the boarding pass and/or similar document grants access to the lounge.

For example, the method described herein involves monitoring the occupancy of the lounge.

For example, the method described herein involves monitoring flight information.

For example, the one or more access/business rules comprise a service hierarchy.

For example, the service hierarchy comprises spa service, shoe shine, showers and pay walk-in.

For example, identifying the one or more contacts includes connecting to a social network account of the user and determining at least one social contact for the user on the social network, wherein the at least one social contact is the one or more contacts.

For example, the processor is configured to alert an administrator of the facility when the device enter or exits the boundaries of the assigned geofence.

For example, the processor is configured to identify the person of interest by determining whether an identifying document of the person of interest grants access to the assigned geofence.

For example, the method described herein involves determining whether the device is authorized to operate within the assigned geofence.

For example, the method described herein involves determining whether the device is within or outside the assigned geofence.

For example, the method described herein involves alerting an administrator of the facility when the device enter or exits the boundaries of the assigned geofence.

For example, the method described herein involves identifying the person of interest by determining whether an identifying document of the person of interest grants access to the assigned geofence.

For example, the method described herein involves identifying a document which can include: a boarding pass, a bank card, a loyalty card and/or a voucher.

For example, the device can alert the user when a further contact enters or exits the assigned geofence.

For example, identifying the at least one contact includes connecting to a social media account of the user and determining the at least one contact among people that are connected to the user via the social media account.

For example, the method described herein involves alerting the user when a further contact enters or exits the assigned geofence.

For example, the method described herein involves identifying the at least one contact by connecting to a social media account of the user and determining the at least one contact among people that are connected to the user via the social media account.

The following examples are presented in a non-limitative manner.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, data storage systems (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance (PDA), cellular telephone, smartphone, or tablet device.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

FIG. 1 shows a block diagram illustrating a system 10 for monitoring access to a facility. For example, the system 10 is for a facility including multiple facility units, (for example, an airport, which includes multiple lounges). The system 10 may be extended to multiple facilities of the same type and/or different types, each including multiple facility units and/or lounges.

The system 10 includes a server platform 12 which communicates with a plurality of customer devices 18, a plurality of employee devices 16, and a plurality of administrator devices 14 via a network 20. The server platform 12 also communicates with a plurality of facility devices 22. The server platform 12 may be a purpose built machine designed specifically for implementing a system and method for customer relationship management.

The server platform 12, administrator devices 14, employee devices 16, customer devices 18 and facility devices 22 may be a server computer, desktop computer, notebook computer, tablet, PDA, smartphone, or another computing device. The devices 12, 14, 16, 18, 22 may include a connection with the network 20 such as a wired or wireless connection to the Internet. In some cases, the network 20 may include other types of computer or telecommunication networks.

The devices 12, 14, 16, 18, 22 may include one or more of: a memory, a secondary storage device, a processor, an input device, a display device, and an output device. Memory may include random access memory (RAM) or similar types of memory. Also, memory may store one or more applications for execution by processor. Applications may correspond with software modules comprising computer executable instructions to perform processing for the functions described below. Secondary storage device may include a hard disk drive, floppy disk drive, CD drive, DVD drive, Blu-ray drive, or other types of non-volatile data storage. The processor may execute applications, computer readable instructions or programs. The applications, computer readable instructions or programs may be stored in memory or in secondary storage, or may be received from the Internet or other network 20. An input device may include any device for entering information into devices 12, 14, 16, 18, 22. For example, the input device may be a keyboard, key pad, cursor-control device, touch-screen, camera, or microphone. The display device may include any type of device for presenting visual information. For example, the display device may be a computer monitor, a flat-screen display, a projector or a display panel. An output device may include any type of device for presenting a hard copy of information, such as a printer, for example. The output device may also include other types of output devices such as speakers, for example. In some cases, device 12, 14, 16, 18, 22 may include multiple of any one or more of processors, applications, software modules, second storage devices, network connections, input devices, output devices, and display devices.

Although devices 12, 14, 16, 18 and 22 are described with various components, one skilled in the art will appreciate that the devices 12, 14, 16, 18 and 22 may in some cases contain fewer, additional or different components. In addition, although aspects of an implementation of the devices 12, 14, 16, 18 and 22 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 12, 14, 16, 18, 22 and/or a processor to perform a particular method.

In the description that follows, devices such as server platform 12, administrator devices 14, employee devices 16, customer devices 18, and facility and store devices 22 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 12, 14, 16, 18, 22 may send information to the server platform 12. For example, a customer using the device 18 may manipulate one or more input devices (e.g. a mouse and a keyboard) to interact with a user interface displayed on a display of the device 18. Generally, the device may receive a user interface from the network 20 (e.g. in the form of a webpage). Alternatively or in addition, a user interface may be stored locally at a device (e.g. a cache of a webpage or a mobile application).

Server platform 12 may be configured to receive a plurality of information, from each of the plurality of customer devices 18, employee devices 16, administrator devices 14, and facility and store devices 22. Generally, the information may comprise at least an identifier identifying the store, facility, administrator, employee or customer. For example, the information may comprise one or more of a username, e-mail address, password, or social media handle.

In response to receiving information, the server platform 12 may store the information in storage database. The storage may correspond with secondary storage of the devices 12, 14, 16, 18 and 22. Generally, the storage database may be any suitable storage device such as a hard disk drive, a solid state drive, a memory card, or a disk (e.g. CD, DVD, or Blu-ray etc.). Also, the storage database may be locally connected with server platform 12. In some cases, storage database may be located remotely from server platform 12 and accessible to server platform 12 across a network for example. In some cases, storage database may comprise one or more storage devices located at a networked cloud storage provider.

For example, a method for monitoring access to a location is provided herein. For example, the location can be the lounge of airport. For example, the method can be performed on an application running on employee device 16 and administrator device 14.

For example, the method includes monitoring the person who is controlling access to the lounge. For example, an employee can be assigned to a specific lounge in an airport, such as a First class U.S. travel lounge, an Executive lounge, etc. Some of the lounges may be located in restricted areas. For example, some of the lounges may be available only to travelers to Asian countries. As another example, a lounge may be available to U.S. travelers only.

The method for monitoring access to a location includes identifying a user using the employee and/or administrator device. For example, identifying a user includes authenticating an employee using the employee device 16. The method for monitoring access to a location includes determining an assigned location associated with the user, wherein the assigned location corresponds to the lounge. For example, the method for monitoring access to a location includes scanning a boarding pass.

The method of configuring which partner has access to the lounge is determined from a central location and distributed across an airport or the entire network. A partner may consist of an airline or other business entity with whom the client lounge provider enters into an agreement.

The partner identifier is configured at the central server, contract parameters are defined, personalized icon is auto generated, hierarchy of services established and distributed at the designated airport lounge location or across the network of airport lounges for a global deployment.

The method for monitoring access to a location includes determining whether the boarding pass and other documents such as bank cards, loyalty cards, coupons, vouchers and similar documents grants access to the location (e.g. lounge). The method for monitoring access to a location includes monitoring the capacity of the location (e.g. lounge). The method for monitoring access to a location includes monitoring flight information. Another method of monitoring lounge occupancy is with algorithms based on average stays for either international or domestic departures, and periods in the day.

Another method of monitoring occupancy is with sensors to detect individual's access in and out of the lounge space. Occupancy thresholds can be used to grant access to related partners and determine whether a reservation sale can be carried out. For example, monitoring access to a location includes monitoring flight information.

In one example, the access/business rules include a service hierarchy. For example, the service hierarchy includes spa service, shoe shine, showers and pay walk-in, etc.

Figure 3:
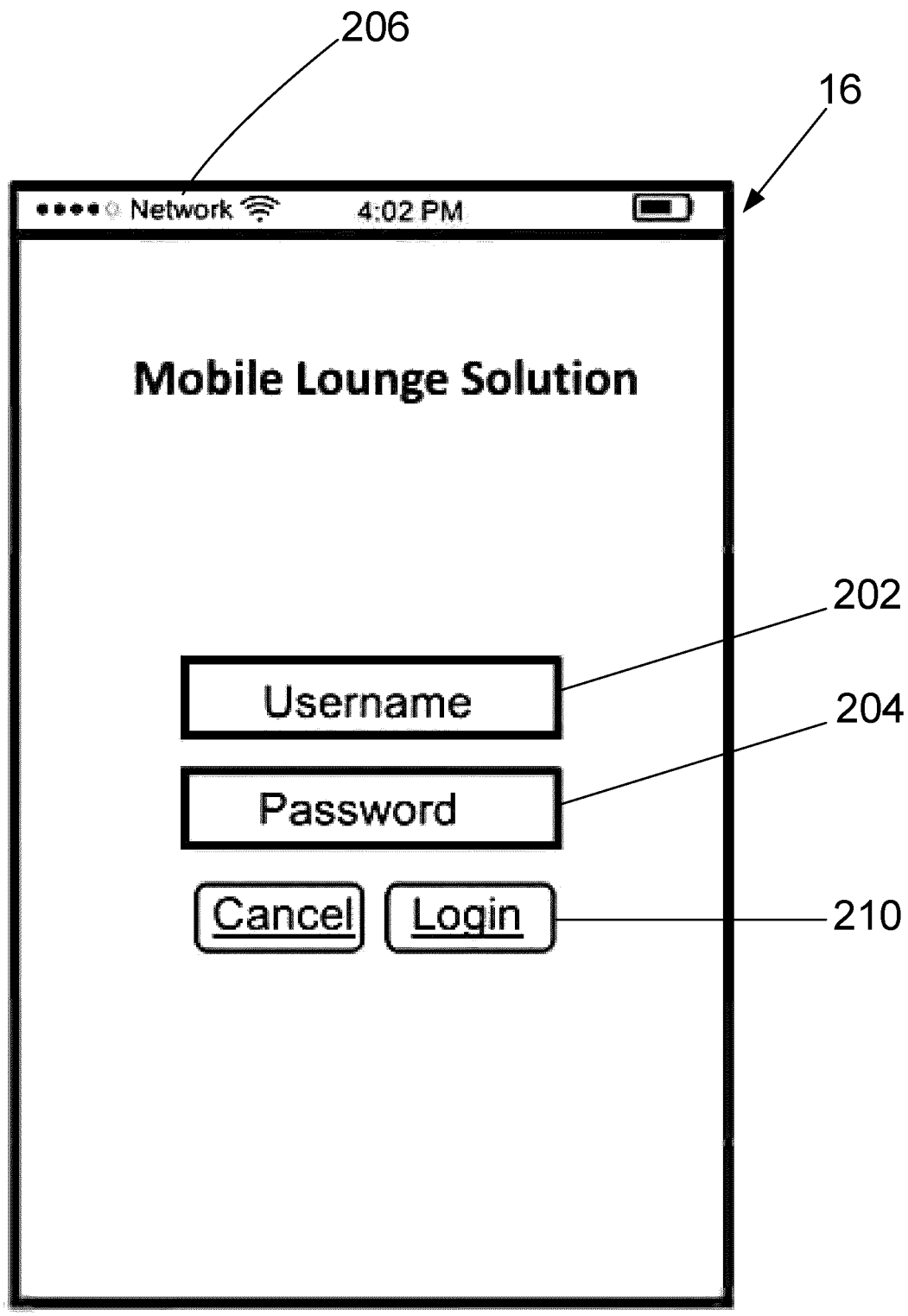
FIG. 3 illustrates a lounge management system according to one example.

For example, the method involves identifying a user using a device. For example, the user can be an employee of a lounge. As shown in FIG. 3, to identify the user, the employee can enter his username 202 and password 204 in an application (app) 206 that is running on the employee device 16. The employee can login 210 in the app 206 to be identified. As for another example, to identify the user, the employee can scan his fingerprint using an app that is running on the device. For example, the app can run a fingerprint recognition software to identify the user of the device at login. Other examples of identification includes: face recognition by taking and validating a photo of the user at login; scanning an identifier (e.g. employee card, radio frequency identification (RFID) pass, etc.) of the employee at login.

Figure 4:
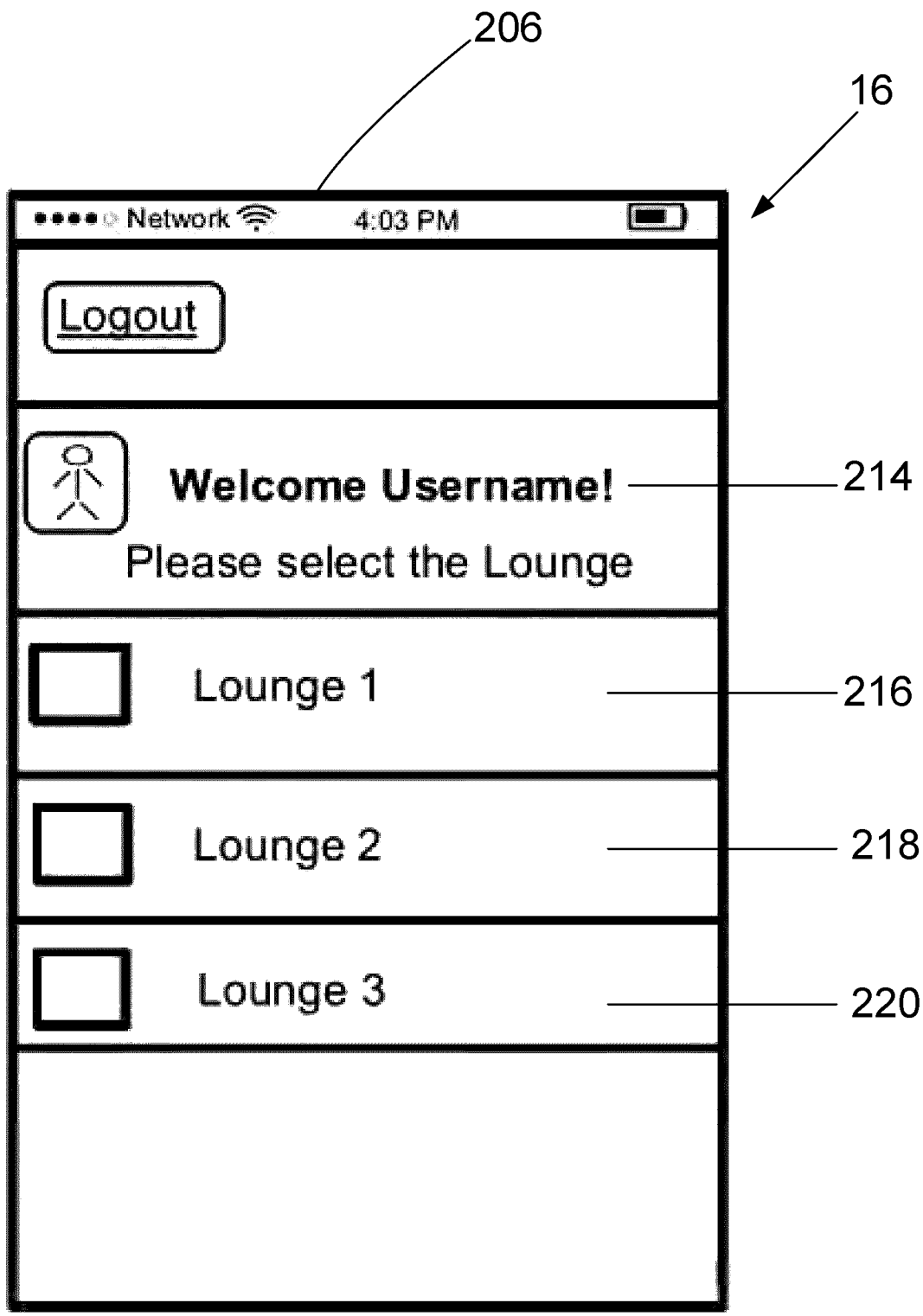
FIG. 4 illustrates a lounge management system according to one example.

The method further involves determining an assigned location associated with the user. For example, as shown in FIG. 4, after login, the app 206 running on the device 16 displays a welcome message 214 and determines that "Lounge 1" 216, "Lounge 2" 218 and "Lounge 3" 220 are assigned to the employee.

The method can also include the act of determining a current location associated with the user. For example, the current location can be a physical space such as hotel lounge, a group gathering center, a retail store, a public and/or private location.

For example, the method could determines that the employee is currently in Lounge 4. Then, the method can involve comparing the assigned location and the current location. For example, an employee can be assigned to work in "Lounge 1", "Lounge 2" and/or "Lounge 3", but can be currently present in "Lounge 4". The method can alert the employee that she is in the wrong lounge.

For example, if the user is located in his assigned lounge, the method can determine a geofence associated with the employee and the device. Then, the method can involve monitoring whether the device is within the geofence. For example, the geofence can be a feature in the app running in the device that uses the global positioning system (GPS) or RFID to define geographical boundaries within a facility, such as an airport. For example, the geofence can allow an administrator of the airport to set up triggers so that when the device enters and/or exits the boundaries for a lounge defined by the administrator, an alert is generated by the system and sent to the administrator or to the proper authorities. For example, the app can send its location to servers that monitor boundaries of a lounge (such as Lounge 1) by longitude and latitude or through user-created and Web-based maps. For example, administrators of each lounge can define boundaries of the corresponding lounge on a map of the facility.

For example, the geofence can rely on Wi-Fi, cellular data, GPS, location beacons and/or RFID. For example, the geofence can be active or passive. For example, the active geofence can ask the employee to opt-in to a current lounge (such as Lounge 3) and ask the employee to leave the mobile app open on the device. For example, the passive geofence can be always ON. In that way, the passive geofence can work in the background without requiring the app to be open.

Figure 5:
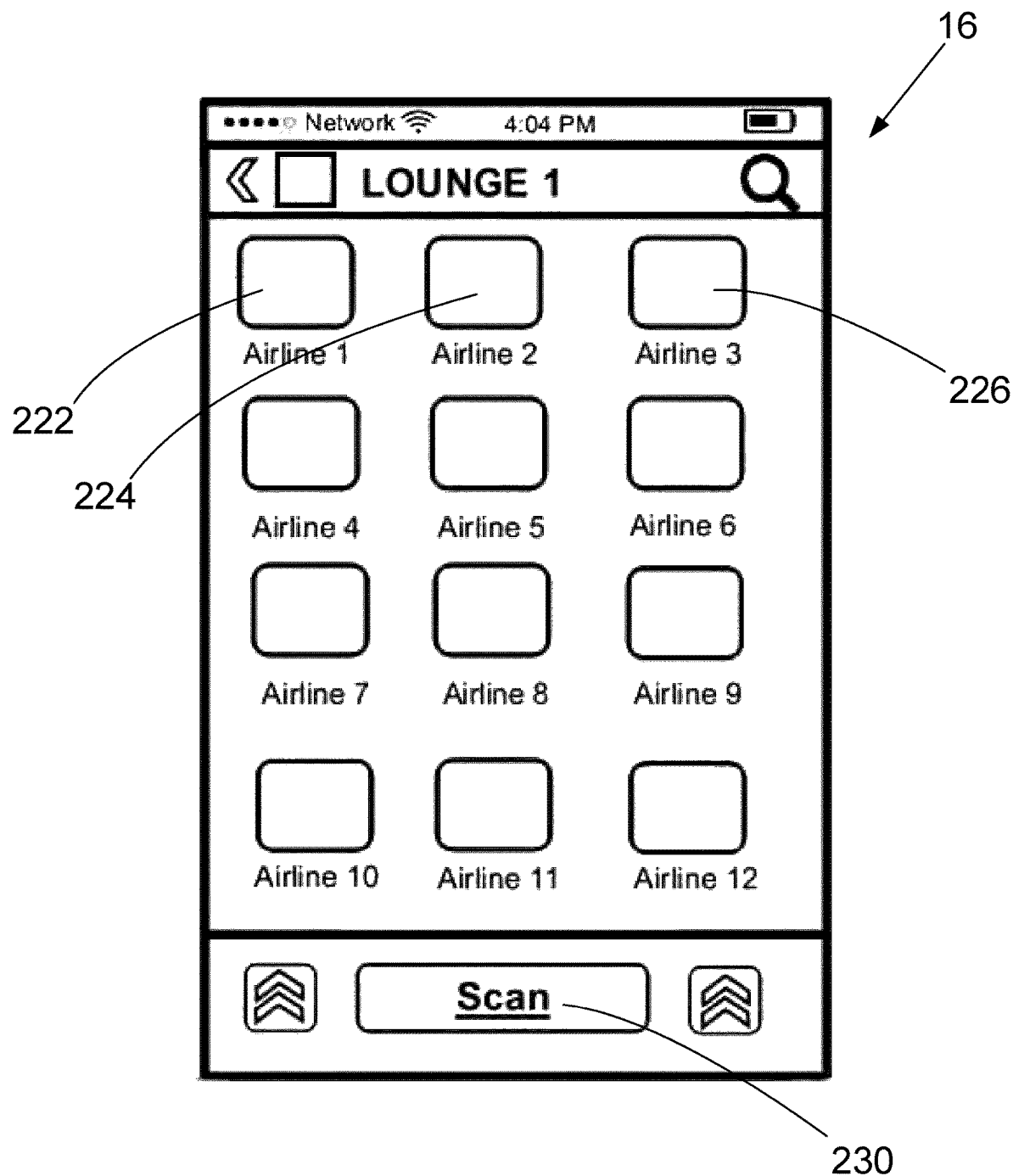
FIG. 5 illustrates a lounge management system according to one example.
Figure 7:
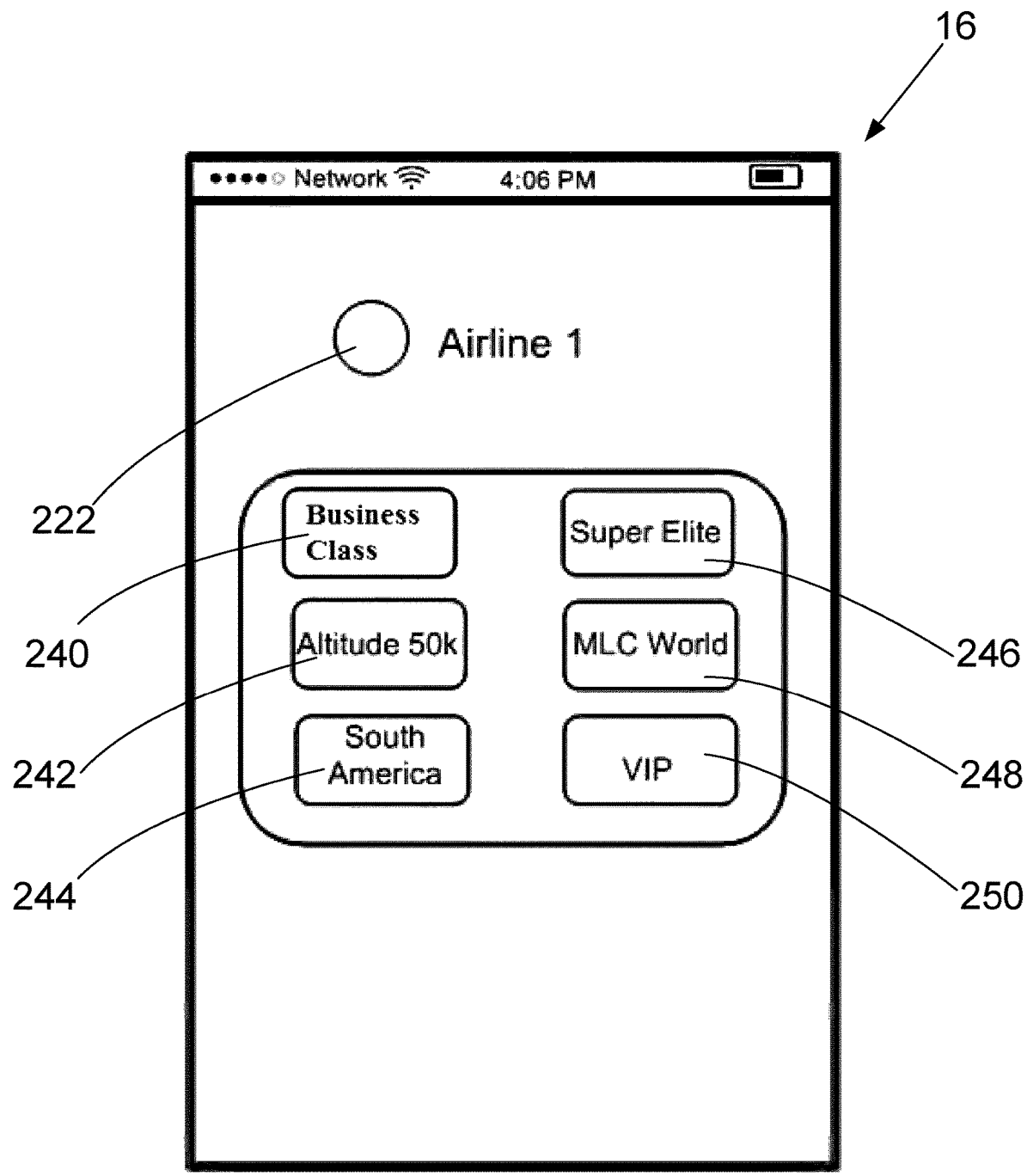
FIG. 7 illustrates a lounge management system according to one example.

For example, the method can involve determining one or more access/business rules associated with a lounge. Referring to FIGS. 4 and 5, an employee can click on Lounge 1 on the device 16 in FIG. 4 to open some access/business rules, such as a list of airlines 222, 224, 226 and services, associated with Lounge 1 as shown in FIG. 5. For example, as shown in FIG. 7, an airline such as Airline 1 222, can have multiple business memberships such Business Class 240, Altitude 50 k 242, South America 244, Super Elite 246, MLC World 248, VIP 250. Each business membership can give access to different tiers and types of services.

Figure 6:
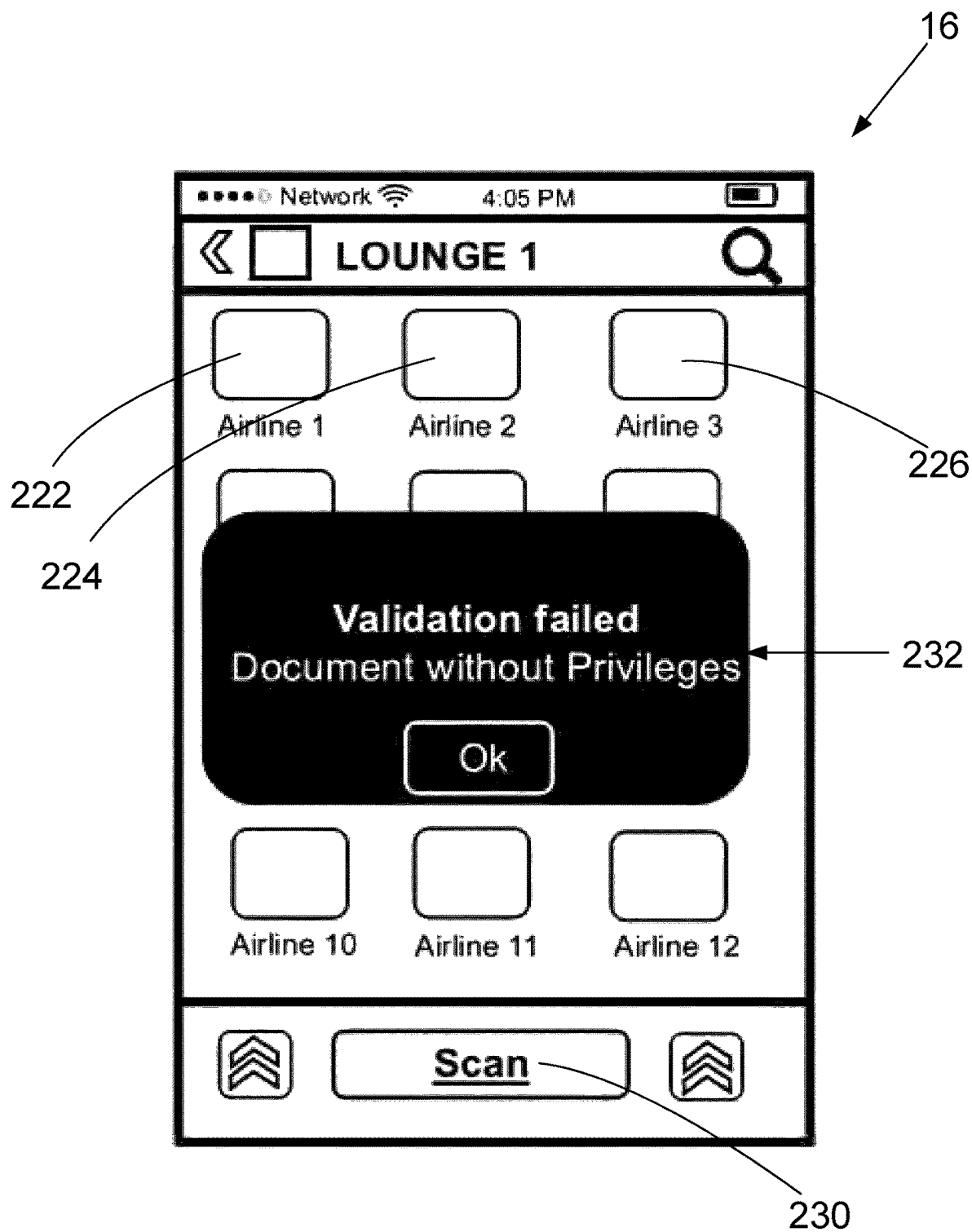
FIG. 6 illustrates a lounge management system according to one example.

For example, to let a person enter a lounge, an employee scans an identifier (such as boarding pass, passport, etc.) of a person trying to access the lounge. Referring to FIG. 5, the employee can also scan 230 a boarding pass of a person requesting access to Lounge 1. Then, the system determines whether the person has privileges to access the lounge. For example, the system determines whether the boarding pass grants access to the lounge. As shown in FIG. 6, if the person is not authorized to enter the lounge, the system will alert 232 the employee.

Figure 8:
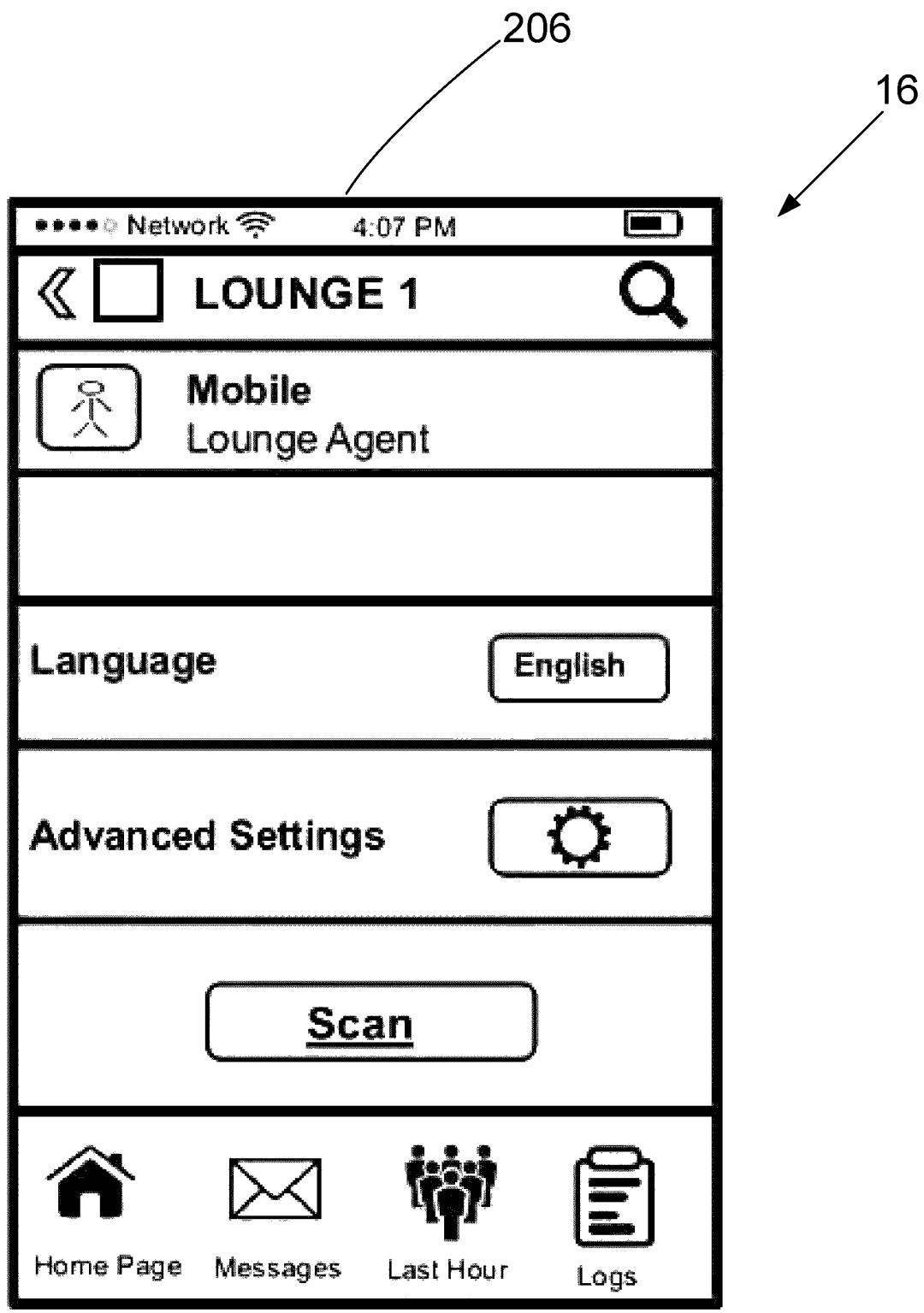
FIG. 8 illustrates a lounge management system according to one example.

FIG. 8 shows the different setting options available to an employee using the app 206 on devices 16.

For example, the app can monitor the capacity of each lounge. For example, through the app, an employee can monitor flight information.

For example, the one or more access/business rules include a service hierarchy. For example, the service hierarchy includes spa service, shoe shine, showers and pay walk-in.

Figure 2:
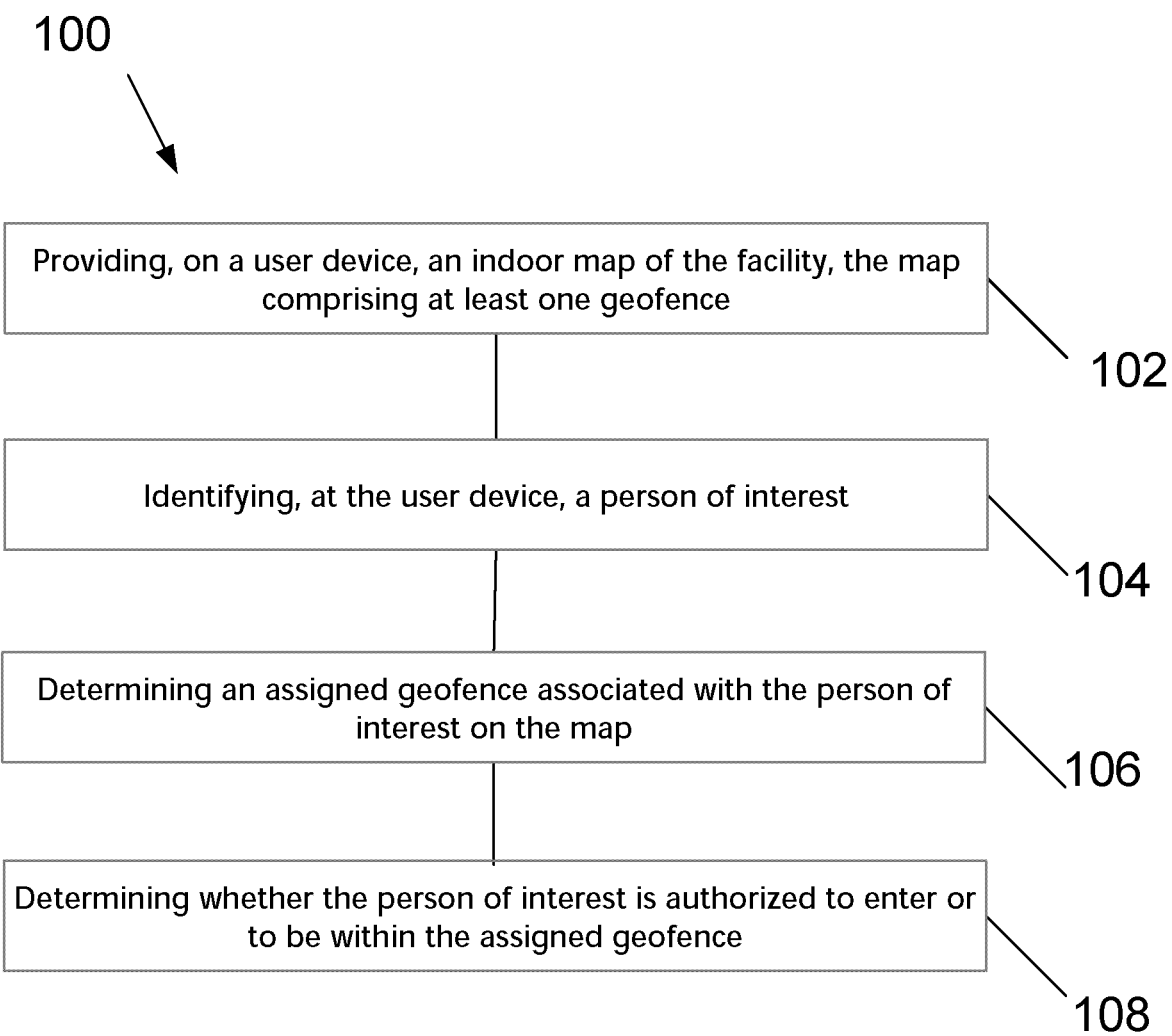
FIG. 2 illustrates a method for monitoring access to a facility according to one example.

For example, FIG. 2 teaches a method 100 for monitoring access to a facility. At 102, the method involves providing an indoor map of the facility on a user device, such as devices 18, 16 and 22. For example, the map can include at least one geofence (e.g. a virtual geographic boundary).

For example, a geofence can be defined on a map using at least one geographic designator. An internet protocol (IP) address can be assigned to each of the at least one geographic designators defining the geofence. The geographic designator and the assigned IP address of the geographic designator can be stored in a database of geofence, wherein the IP address assigned to each of the at least one geographic designators is a unique identifier of the geofence. For example, the IP address can be an IPv6 address, which has enhanced functionality that is associated with IPv6, including providing for improved geofence registration, faster geofence identification/lookup, and the ability to more accurately define the geofences, including the intent of the geofence owner for classes and/or entitlements that provide for permissions for activities, access, and/or messages within the associated geofence.

For example, geofence anchor points can be defined on a map to provide as a member point on a boundary of a geofence or within a geofence boundary. They can also be used as the geofence address, i.e., the geofence address that is registered with the geofence registry. For example, multiple overlapping geofences can occupy the same physical space or geographic space on a map. For example, a geofence can be monitored on a map. The map can run on software or mobile applications (apps) on a device. For example, a region of interest can be provided for the geofence. For example, a lounge geofence can be configured on the map of an airport.

Figure 11:
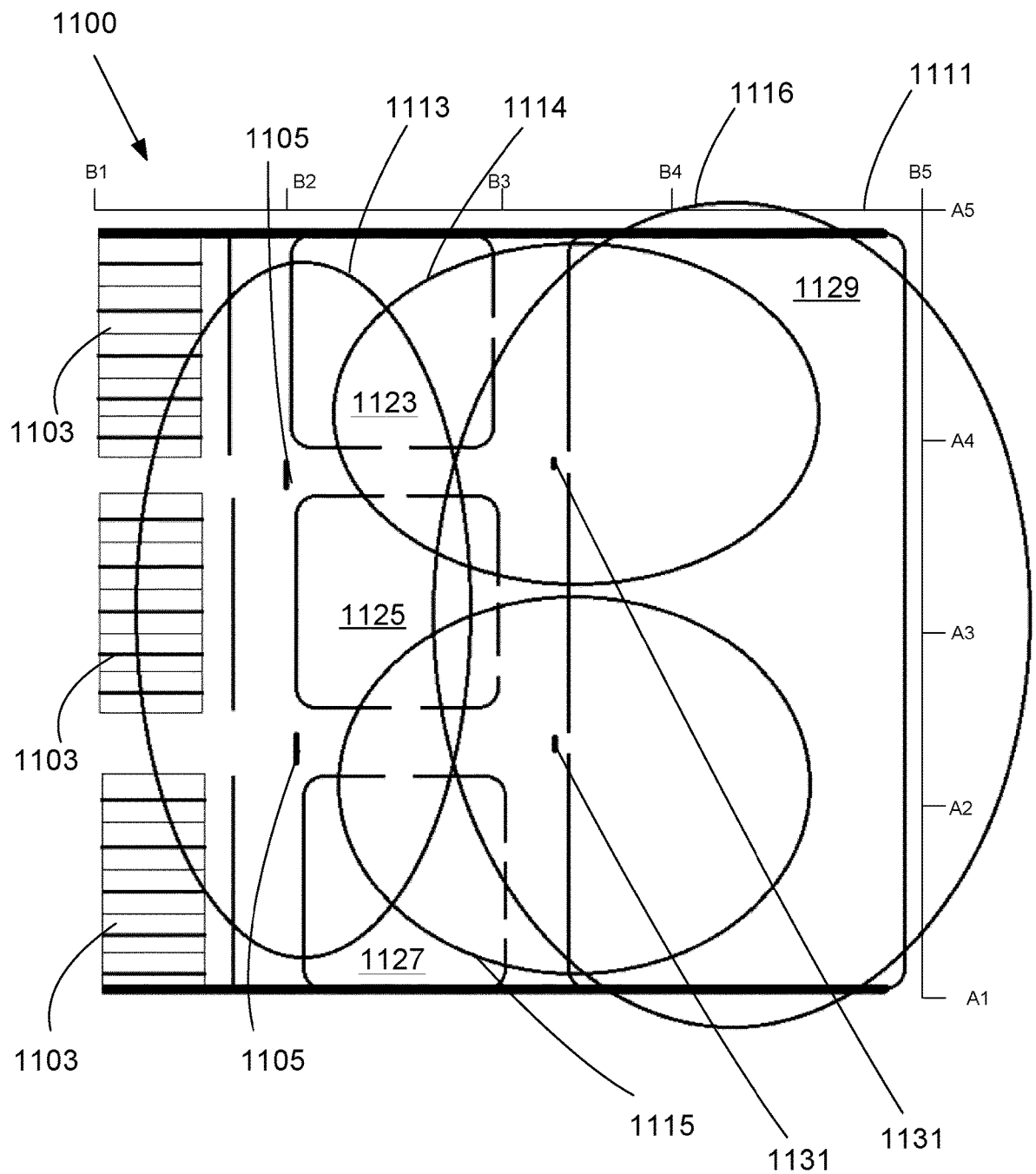
FIG. 11 illustrates a map of an area of a facility, according to one example.

Referring now to FIG. 11, there is shown a map 1100 of an area of a facility. For example, the facility can be airport. For example, the map can be the map of an airport including lounge areas. Seating sections 1103 are shown in the map 1100. Lounges 1123, 1125, 1127 and 1129 are shown on the map 1100. Check point stations 1105 can be configured to control access to lounges 1123, 1125 and 1127. For example, employees of an airport can be positioned at checkpoint stations 1105 to control access to lounges 1123, 1125, 1127 and 1129. For example, access to lounges 1123, 1125, 1127 and 1129 can be monitored by an application running on an employee device and/or administrator device.

For example, access to lounges 1123, 1125, 1127 and 1129 can be monitored multiple ways. For example, administrators can monitor the person(s) that is(are) controlling or giving access to the lounges 1123, 1125, 1127 and 1129. For example, lounge owners have a need for controlling, supervising, regulating or restricting entry to lounges. At the same time, lounge owners also have an interest in controlling and/or monitoring the behavior of employees who are physically giving access to the lounge to other people. Monitoring employees adds an extra layer of security. In today's climate, anyone can potentially be a threat. For example, employees can potentially abuse their security clearance to compromise security of the airport including lounges. As security is always a concern inside an airport, one of the preventive measures is to implement sound security and access policies.

For example, one of the preventive measures includes monitoring the person who is controlling access to the lounge. Referring to FIG. 11, employees can assigned to checkpoints 1105 to control access to lounges 1123, 1125, 1127 and 1129. For example, checkpoints 1105 can be equipped with checkpoint devices, such as mobile devices for identifying, monitoring and granting access to users authorized to operate the checkpoints 1105. At the same time, such devices can also be used to grant travelers access to lounges 1123, 1125, 1127 and 1129.

For example, some of the devices can be configured to only operate within geofences 1113, 1114, 1115 and 1116 as shown in FIG. 11. For example, an employee can be authorized to operate the checkpoint device within one or more of the geofences 1113, 1114, 1115 and 1116. For example, an employee can be authorized to operate the checkpoint device only within the geofences 1113. If the employee leaves the geofence 1113 and enter the geofence 1116, the monitoring system can detect that the employee is no longer within her assigned geofence and alert administrator and/or security of the airport of a potential threat.

For example, to operate the checkpoint device, the monitoring system identifies the user seeking access. For example, identifying an authorized user includes determining whether an employee is authorized to use the checkpoint device. For example, identifying an authorized user includes authenticating an employee using the checkpoint device. For example, the checkpoint device can be an employee device 16. After that, the monitoring system determines an assigned location associated with the authorized user. For example, an employee, who is authorized user, can be assigned to monitor access within geofence 1113. For example, an employee, who is authorized user, can be assigned to monitor access within geofences 1113, 114 and 1115; and at the same time, the employee may not be authorized to enter geofence 1116. For example, an employee can be authorized to operate checkpoint 1105 and, at the same time, may not be authorized to operate checkpoint 1131. The monitoring system advantageously allows airport administrators to lounge owners to monitor and control employees on the ground by restricting access and detect unauthorized access with geofences.

As shown in FIG. 3, to identify an authorized user, the employee can enter his username 202 and password 204 in an application (app) 206 that is running on the checkpoint device 16. The employee can login 210 in the app 206 to be identified. As for another example, to identify whether an employee is an authorized user, the employee can scan his fingerprint using an app that is running on the device. For example, the app can run a fingerprint recognition software to identify the user of the device at login. Other examples of identification includes: face recognition by taking and validating a photo of the employee at login; scanning an identifier (e.g. employee card, radio frequency identification (RFID) pass, etc.) of the employee at login.

Once an employee has been identified, an assigned location is determined for the employee. For example, as shown in FIG. 4, after login, the app 206 running on the device 16 displays a welcome message 214 and determines that "Lounge 1" 216, "Lounge 2" 218 and "Lounge 3" 220 are assigned to the employee. For example, referring to FIG. 11, geofence 1113 can be assigned to the employee. For example, geofences 1113, 1114 and 1115 can be assigned to the employee. For example, the device can display a map to the employee to show the geofence that is assigned to the employee.

For example, geofence anchor points can be defined on the map 1100 to provide member points on a boundary of a geofence or within a geofence boundary. For example, anchor points (B3, A4) and (B4, A4) can be defined as being within the geofence 1114.

For example, administrators of the lounges can assigned employees to specific geofences. For example, referring to FIG. 11, a lounge administrator can set the system such that an employee is authorized to operate checkpoint 1105 within geofence 1105.

For example, geofences 1113, 1114, 1115 and 1116 can be monitored on the map 1100. The map 1100 can run on software or mobile applications (apps) on a device. For example, a new geofence can be configured as a region of interest of the map 1100. For example, the software or mobile application can allow an authorized user to set a geofence for the region defined by coordinates A1-A5 and B3-B5. For example, the coordinates A1-A5 and B1-B5 of the A and B axis can be used to define geofences. For example, the coordinates A1-A5 and B1-B5 can be used to define a geofence for lounge 1129 by configuring a geofence corresponding to the region within coordinates A1-A5 and B1-B5, as lounge 1129 is defined by the region within coordinates A1-A5 and B1-B5.

For example, an employee device can have an app that is running on the employee device. Then, when the employee device is physically or proximally in predetermined location within the geofence, such as a lounge, the lounge geofence may have restrictions that disable or block the app from functioning when the mobile device location services indicate that it is not within the lounge geofence.

Referring back to FIG. 2, at 104, the method 100 involves identifying a person of interest, such as an employee. At 106, the method 100 involves determining an assigned geofence associated with the person of interest on the map. At 108, the method involves determining whether the person of interest is authorized to enter or to be within the assigned geofence.

For example, the method can involve determining whether the device is authorized to operate within the assigned geofence. For example, the method can involve determining whether the device is within or outside the assigned geofence. For example, the method can involve alerting an administrator of the facility when the device enters or exits the boundaries of the assigned geofence. For example, the method can involve identifying the person of interest by determining whether an identifying document of the person of interest grants access to the assigned geofence. For example, the identifying document can be one of: a boarding pass, a passport, a bankcard, a loyalty card and/or a voucher.

For example, a customer relation management system provides business intelligence by incorporating information acquisition, information storage, and decision support functions to provide customized services. It analyzes and classifies data to address customer needs in order to promote greater customer satisfaction and retention.

The customer relation management system provides building long term and profitable relationships with customers. For example, the customer relation management system can be configured to build long term and profitable relationships with identified customers, chosen customers and/or most frequently visiting customers.

The customer relation management system can provide information about an identified customer at every point of contact of the system. The customer relationship management system can provide all the following phases: acquire and retain customers; understand and differentiate between customers; develop and customize customer services; interact and deliver customized services.

The customer relationship management system can be configured to adopt customer-based measures. The customer relationship management system can be configured to segment customers. The customer relationship management system can be configured to develop end-to-end processes.

The payment system can include an automated clearing house (ACH) system, a wire transfer system, a debit card system, a credit card system, or any other suitable electronic funds transfer (EFT) system, including point redemption, electronic currencies.

All the applications can be connected to the payment system. However, some of the applications may not be connected to the payment system in some embodiments of the invention.

In one embodiment, the payment system can include an ACH system with one or more originating depository financial institutions (ODFI) and one or more receiving depository financial institutions (RDFI).

The guest management system includes a database of guests associated with a customer. The guest management system can be integrated within the customer relationship system.

A bar management system can be configured to manage a restaurant and a bar. For example, the bar management system can be configured to management the restaurant and bar located at an airport lounge. For example, the bar management system can include two separate applications: an application for staff (bar staff app); and one application for customers (customer app).

For example, the bar management system can be used to: take food and drink orders; serve food to customers; process payments for the orders; show available goods and services; show customer information; and provide customer reviews.

Figure 9:
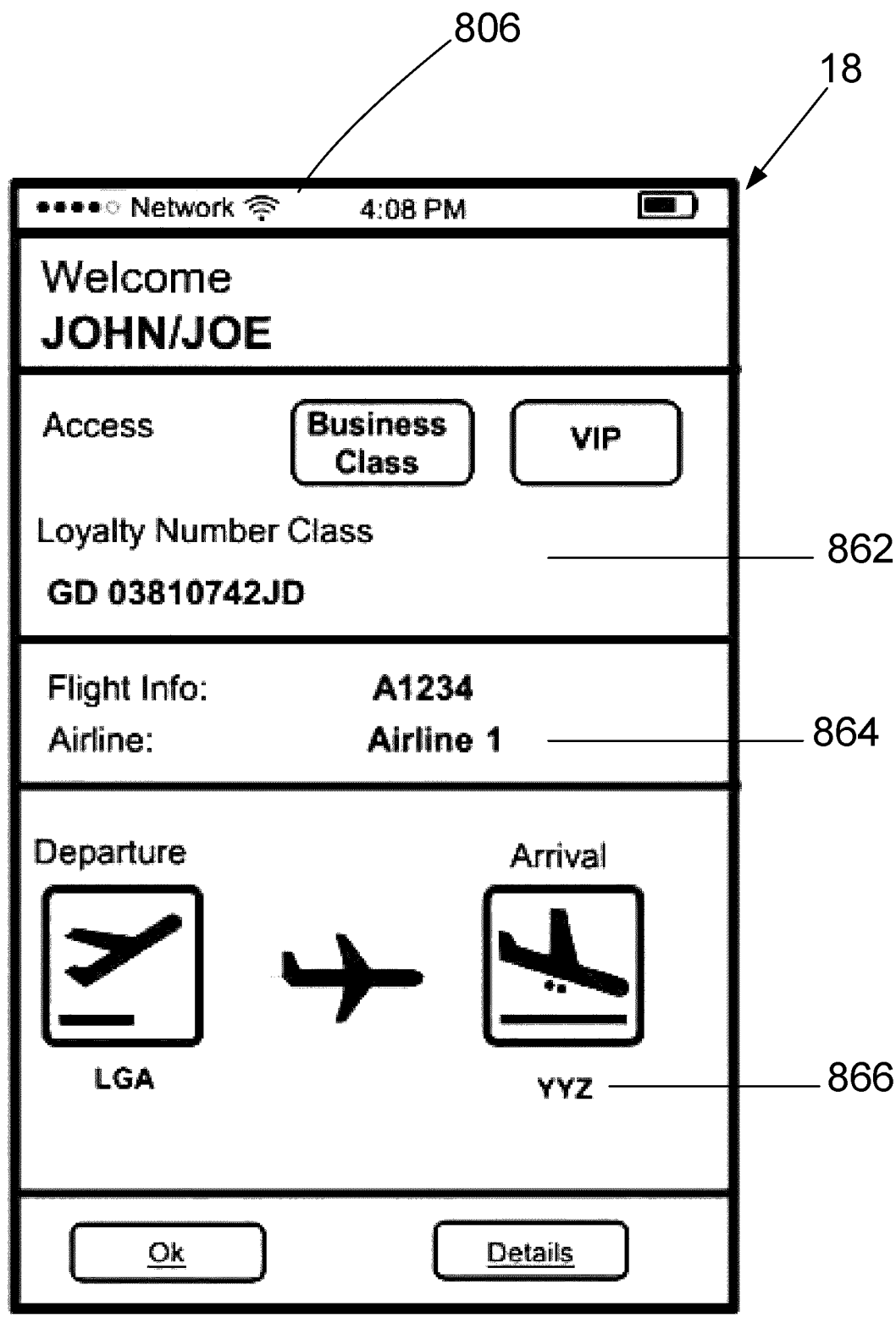
FIG. 9 illustrates a lounge management system according to one example.

FIG. 9 shows an example of a customer app 806 that is running on the customer device 18. The app 806 can display the access privileges 862 associated with the customer. The app 806 can also display flight and schedule information 864, 866 associated with the customer.

For example, a customer can order food through the customer app. For example, the customer can access the system through a network connection (such as Wi-Fi) and order food, and staff at the bar will see the order through the bar staff app. After preparing the food, staff will tell the bar management system through the bar staff app that the food is ready. For example, a waiter can get the confirmation of food from the bar staff app, and, through the bar staff app, the waiter can deliver the food to the right customer. For example, the bar staff app can have a map showing the precise location of the customer within the restaurant lounge.

Figure 12:
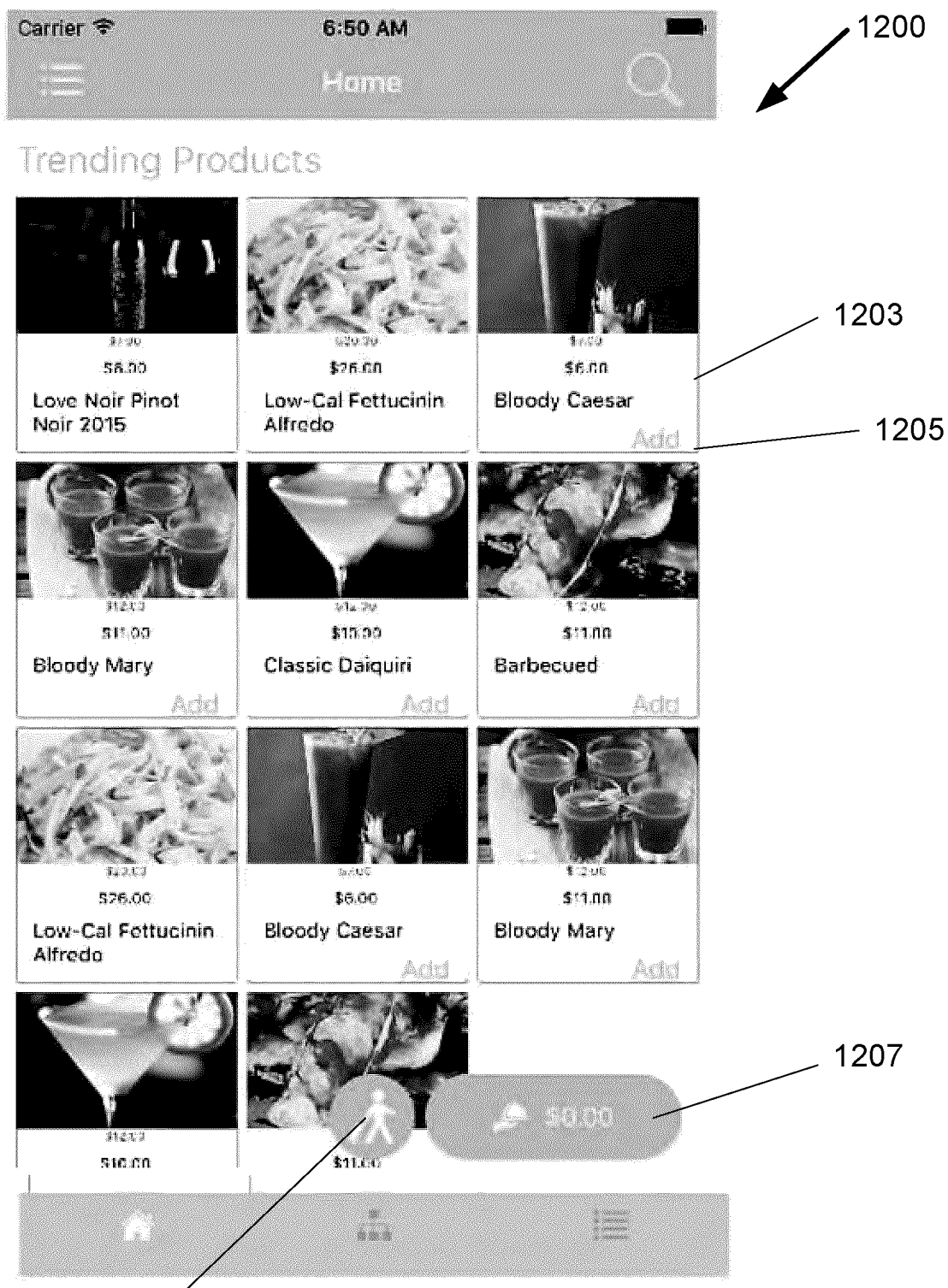
FIG. 12 illustrates a menu selection on a customer, according to one example.

FIGS. 12, 13, 14, 15 et 16 show exemplary embodiments of some of the interface of the customer app. Referring to FIG. 12, there is shown an interface 1200 of the customer app. A user can select a menu 1203 on the interface 1200 such as a "Bloody Ceasar". For example, the user can press on the "Add" button 1205 to add the menu 1203 to the tray 1207. A travel status button 1209 allows a customer to open a view of her travel information, such as the interface 18 shown on FIG. 9.

For example, the customer app can dynamically present the available items for purchase including drinks and food. For example, the price of an item is dynamically updated from the interface accessible by the user and reflected in real time on the local app. For example, the customer app interface can display event sponsorship, for example, from vendors who enter into an agreement to present their goods/services to users of the customer app. For example, a vendor can be a local vineyard.

For example, the apps provided herein can visually present access partners to users, their corresponding access documents and associated guest policy in image and symbol format for easy recognition.

Figure 14:
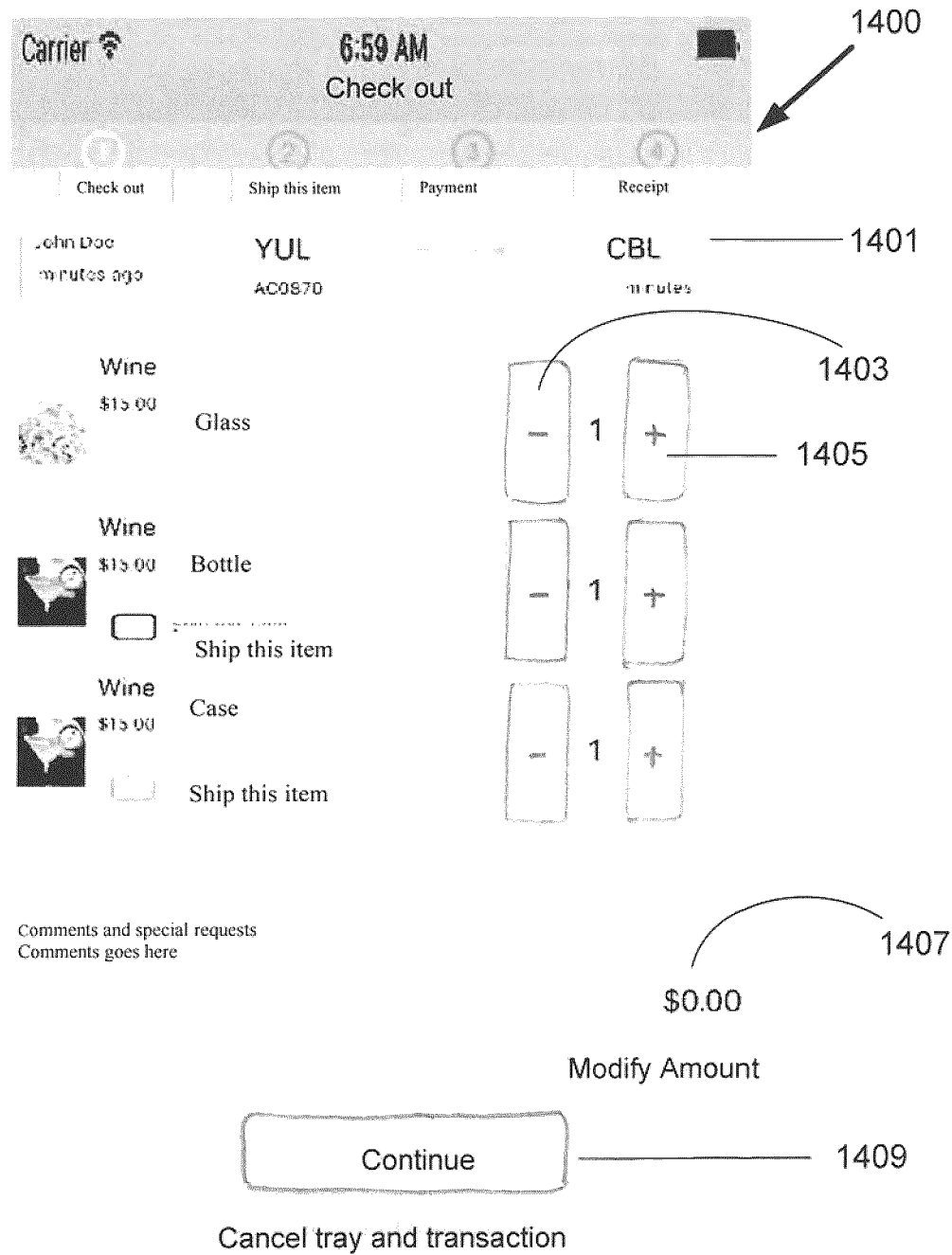
FIG. 14 illustrates a check-out on the customer app, according to one example.

The tray 1207 is configured to receive menu selections from the user for check out. FIG. 14 shows an interface 1400 of the check-out feature of the customer app. Tab 1401 can display an overview of the user's travel schedule. Using button 1403 and 1405, a user can vary the quantity of a particular order. The price 1407 of the items is also shown. By pressing the Continue button 1409, a user can proceed with the menu selection for payment. For example, the tray remembers the menu items for a predetermined length of time. Extra features such as different color or size options, quantity of order, and matching item links can be found linked from the tray.

Figure 13:
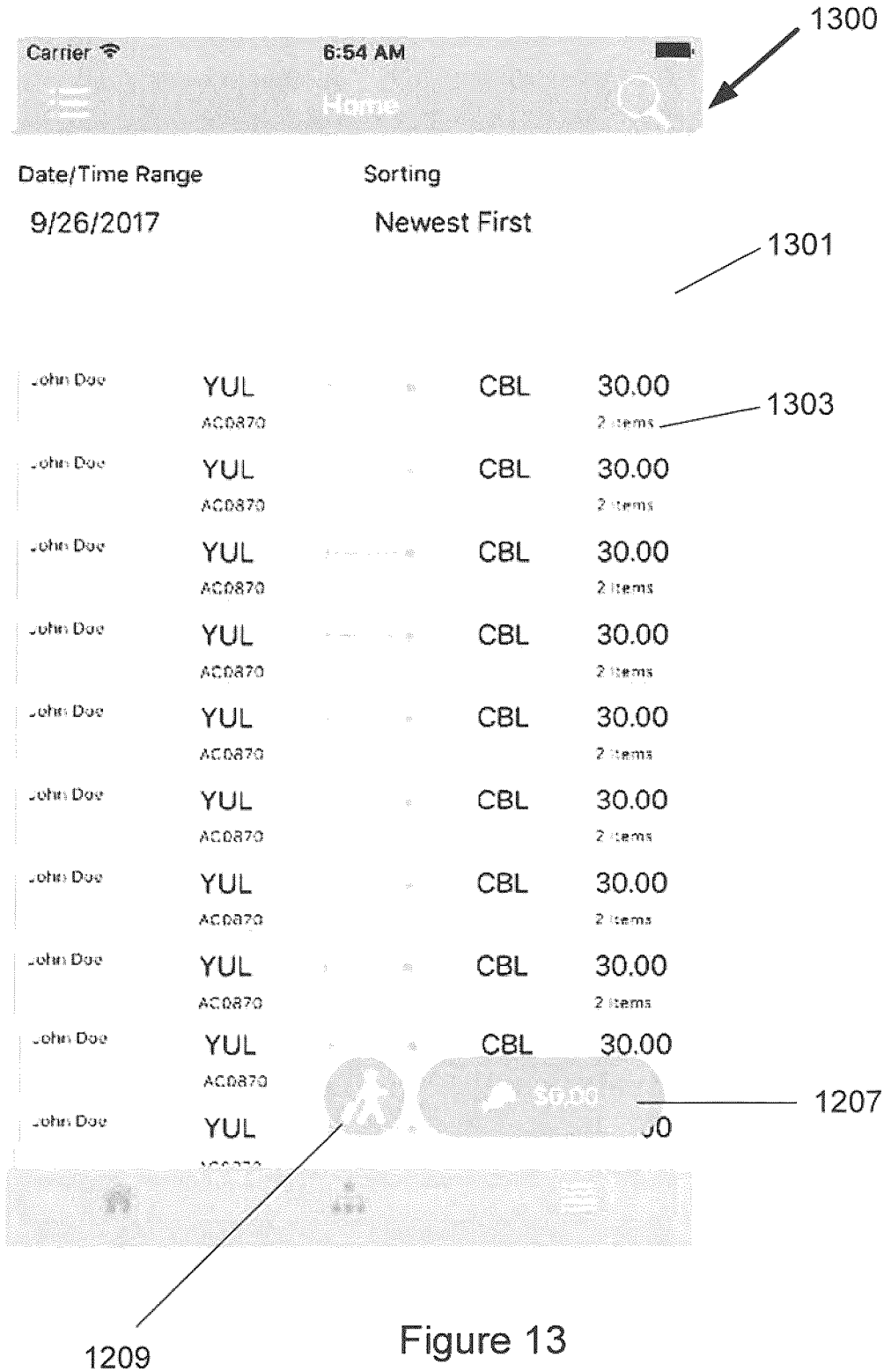
FIG. 13 illustrates a history of user purchases on the customer app, according to one example.
Figure 15:
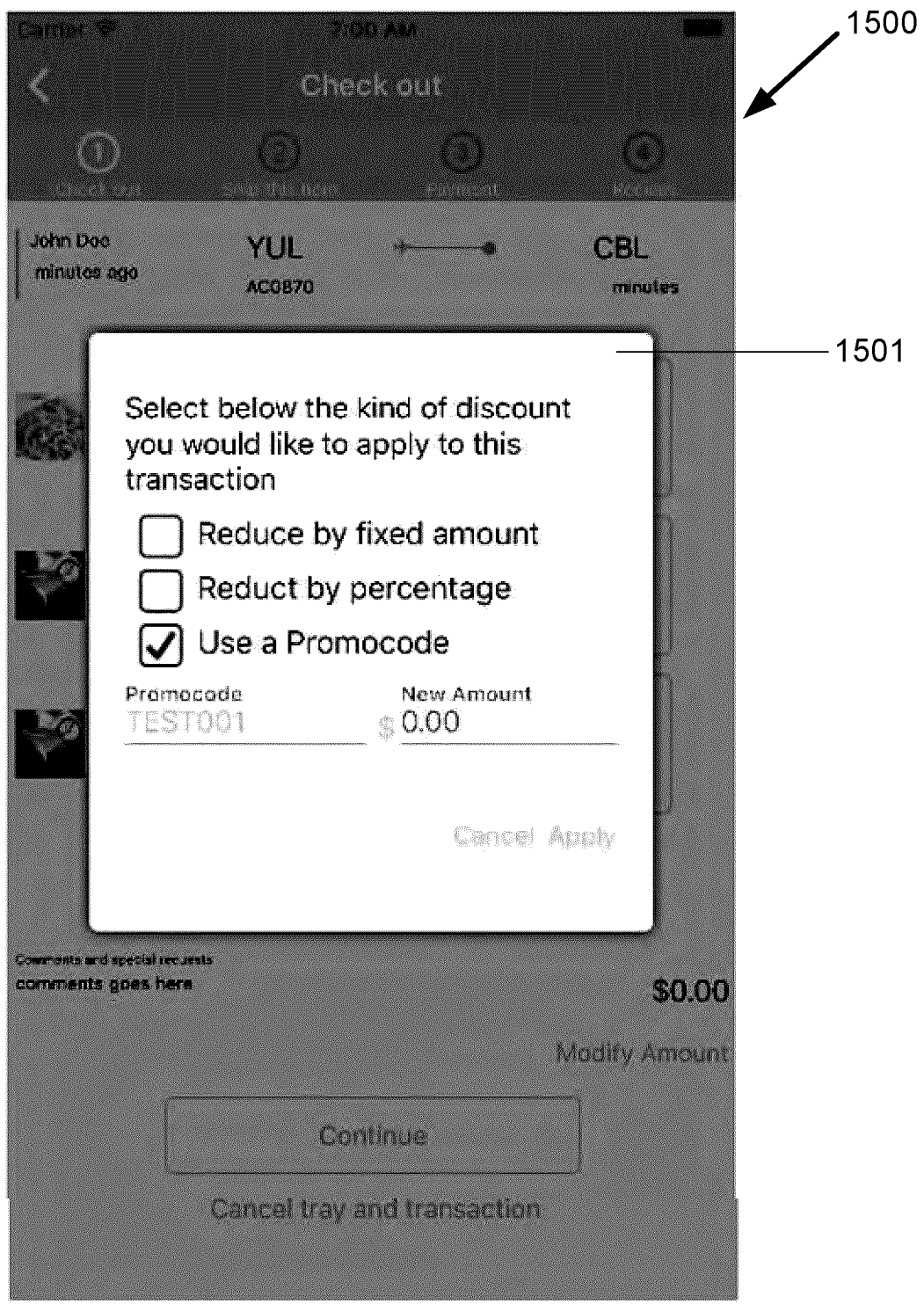
FIG. 15 illustrates a view of a discount dialog box on the customer app, according to one example.
Figure 16:
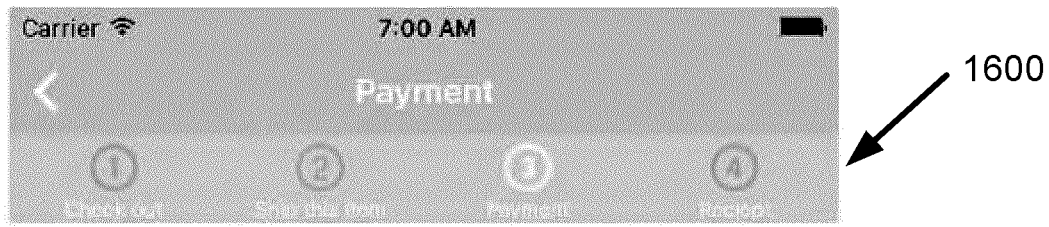
FIG. 16 illustrates a payment interface of the customer app, according to one example.
Figure 16:
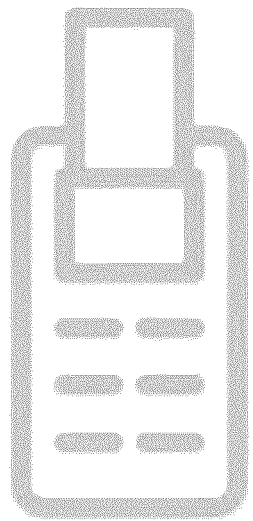
Figure 16:
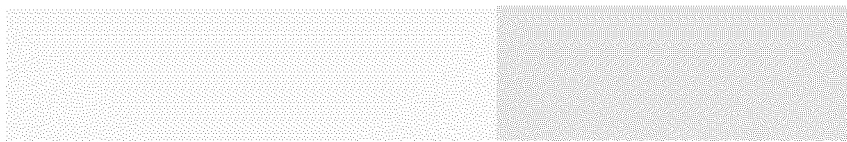

Referring to FIG. 13, there is shown a view 1300 of user purchases on the customer app, for example, 1301 and 1303. FIG. 15 shows a view 1500 of a discount dialog box 1501 for entering discount information before checkout. FIG. 16 shows the payment interface 1600 of the customer app.

For example, the bar staff app can be used to manage all activities related to the restaurant and bar. The bar staff app can be configured to manage the bar and restaurant effective and efficiently by computerizing customer orders (such as orders for drinks and meals), billing and inventory control.

The bar staff app can also receive customer orders from the customer app.

The bar staff app processes transactions and stores the generated data. Data will be generated from the bar staff app and the customer app. These data may help managers and staff to make appropriate business decisions for the bar and restaurant. For example, knowing the numbers of orders for a particular day, the manager can device whether more staff are required. The bar staff app may be configured to calculate daily expenditures, projections, and profits.

For example, the customer app can be used by the customers to order food and drinks. Customers can also give feedback through the app.

Customers can also pay their order through the customer app. For example, the customer app can connect to the payment management system and access the customer profile to process payments.

Customers can also make payment using debit or credit cards through the customer app. This customer app allows a customer to register for a customer account. Payments can be saved to the bar management system database. Customers can also see current discount menus through the customer app.

The customer app can also suggest menus to customers. The customer app can be configured to display calorie charts for every item on the menu.

The customer app can also propose sponsored events and products from participating vendors.

Regarding customer service, the customer can turn on their geolocation feature on their phone so that staff members can come and serve them directly.

All the information about customer orders will be saved in the system. For example, all information about customer orders will be saved in the customer relationship database. All activities performed by the customer or on behalf of the customer and their guests are assembled in order to determine the value of the customer.

A lounge management system can be configured to manage the lounge, facility, accommodation (services). For example, using the lounge management system, staff can enter, in real time, records of cleaning activities and supply replenishments. For example, the lounge management system can maintain detailed reports on activities performed in cleaning, maintaining and supplying defined areas such as lounge suites, conference rooms, waiting rooms, restrooms, showers and others.

For example, the lounge management system can include a customer hospitality app. For example, using the customer hospitality app, a customer can reserve a shower room, or any other rooms, etc. For example, the customer can see in real time which shower is available and a map of where the shower is located. For example, the customer can request hospitality services, such as towel service, garment pressing, etc. For example, using the customer hospitality app, a customer can also send messages to the lounge managers on issues that require attention.

For example, the lounge management system can include a staff hospitality app. For example, the staff hospitality app can keep track of cleaning of the lounge area, including bathrooms, showers, public restrooms, private rooms, conference rooms, quiet rooms, etc.

A social management system can be configured to maintain user social information. The social management system can identify a social contact for a user. For example, the social management system can log into a user's social networks (such as Facebook and LinkedIn) and identify all the contacts associated with a user. The social management system can keep track of all contacts associated with a user. The social management system can assign locations to contacts associated with a user. For example, the social management system can determine whether a contact is within the vicinity of a user.

The social management system can determine a geolocation data for each contact associated with a user. The social management system can match a user to a social contact by using geolocation services The location may be determined in real time or substantially real time using geolocation services, such as IP geo-location (e.g., using the registered location of their IP address/Internet Service Provider (ISP)), mobile phone GPS systems, and so on. Location beacons are also used where interactions are triggered by digital captured events designed to enhance the customer experience.

For example, the social management system can request GPS location and compare received location information (e.g., latitude, longitude, altitude information) to a map of the particular facility (such as a lounge). The social management system can identify whether the location is associated to an indoor map or an outdoor map.

For example, the system may receive the location from one of the systems described herein, such as the customer relationship management system. For example, the location is periodically updated to reflect movements of the user to different locations. Periodical updates may be recorded by the customer relationship management system.

The location information may be utilized by the system to identify other users within a user and/or administrator defined distance from the current location of the user, optionally even when the user did not manually provide the system with the user's location.

In one example, a method of matching a guest to his contacts is provided. The method includes determining whether the guest is in the lounge and identifying one or more contacts associated with the guest. The social management system can be configured to automatically present to a guest a list of identified contacts when the guest enters a lounge.

For example, identification of the contacts includes connecting to a social network account of the guest (such as Facebook™, LinkedIn™) and determining the contacts of the guest in these social networks. The identification can be automatically performed by the social management system every time a guest enters a lounge.

The method also includes determining whether the contacts of the guest are located inside the lounge. The method also includes alerting the guest of the presence of one of his contacts and giving the guest the option to get in touch with his contacts by sending them a text message, for example.

Figure 10:
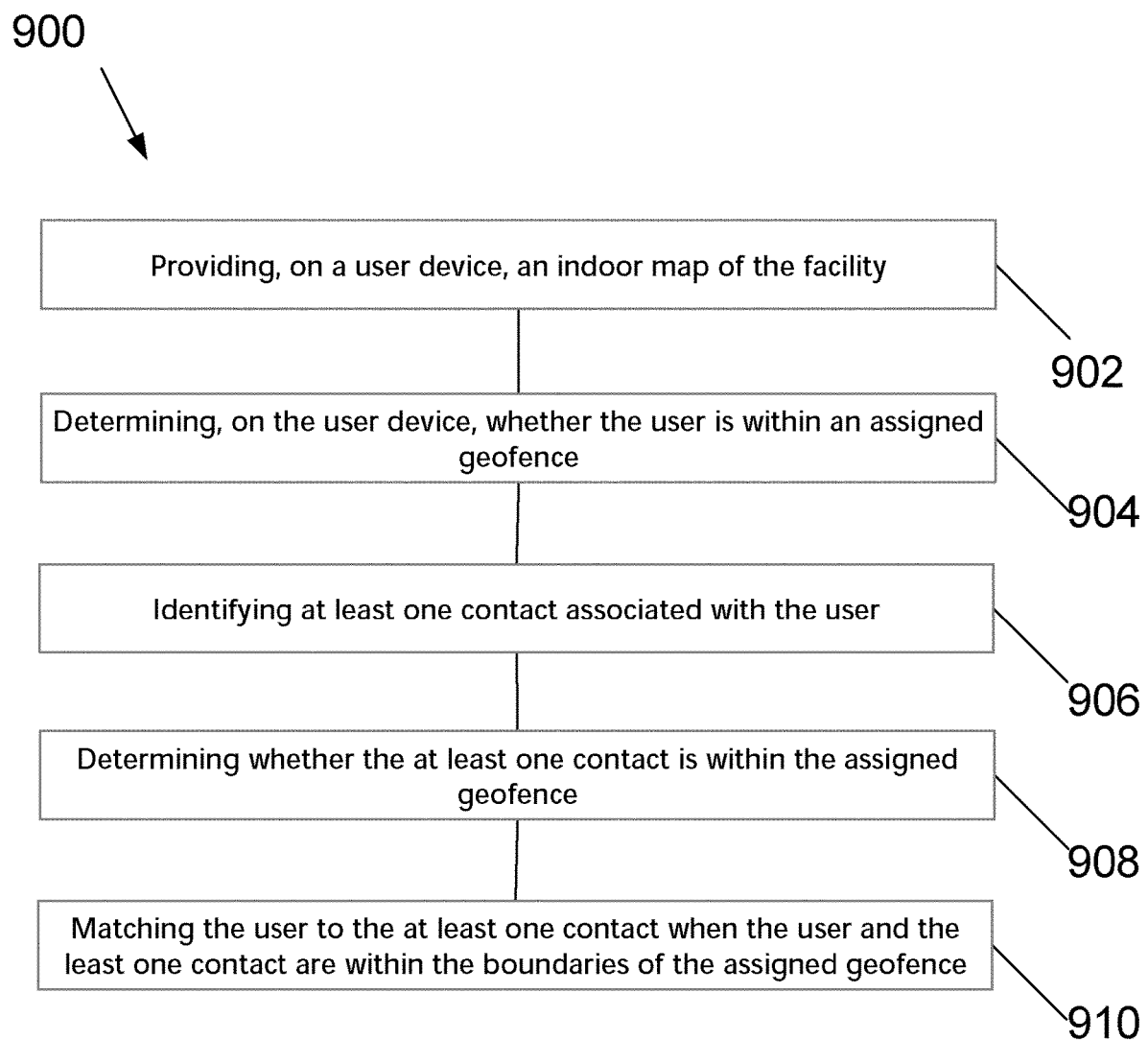
FIG. 10 illustrates a method for matching a user and a contact in a geofence of a facility according to one example.

Referring now to FIG. 10, there is disclosed a method 900 for matching a user and at least one contact in a geofence of a facility. At 902, the method includes providing, on a user device, an indoor map of the facility, the map comprising at least one geofence.

At 904, the method involves determining whether the user is within an assigned geofence. At 906, the method involves identifying at least one contact associated with the user. For example, identification of a contact associated with the user includes connecting to a social network account of the user (such as Facebook™, LinkedIn™) and retrieving a contact from the list of contacts/friends of the user. At 908, the method involves determining whether the least one contact is within the assigned geofence. For example, the contact may have checked inside the lounge within the geofence, so that their presence has been registered by the system. At 910, the method includes matching the user to one of his contacts when the user and the contact are within the boundaries of the geofence.

For example, the method involves alerting the user when a further contact enters or exits the assigned geofence. For example, identifying a contact of a user includes connecting to a social media account of the user and determining the contact among people that are connected to the user via the social media account.

The person skilled in the art would understand that the various properties or features presented in a given example can be added and/or used, when applicable, to any other example covered by the general scope of the present disclosure.

The examples of preceding paragraphs of the present disclosure are presented in such a manner in the present disclosure so as to demonstrate that every combination of examples, when applicable can be made. These examples have thus been presented in the description in a manner equivalent to making dependent claims for all the examples that depend upon any of the preceding claims (covering the previously presented examples), thereby demonstrating that they can be combined together in all possible manners.

The present disclosure has been described with regard to specific examples. The description was intended to help the understanding of the disclosure, rather than to limit its scope. It will be apparent to one skilled in the art that various modifications can be made to the disclosure without departing from the scope of the disclosure as described herein, and such modifications are intended to be covered by the present document.

The invention claimed is:

1. A method of monitoring access to a lounge, comprising:
identifying a user using a device;
determining an assigned location associated with the user;
determining a current location associated with the user, the current location including one of: a physical location, a group gathering center, a store, and a lounge;
comparing the assigned location and the current location;
determining one or more access/business rules associated with the current location, the one or more access/business rules comprising a service hierarchy, the service hierarchy comprising spa service, shoe shine, showers and pay walk-in;
determining a geofence associated with the user and the device; and
monitoring whether the device is within the geofence.

2. The method of claim 1 further comprising visually presenting access partners, their corresponding access documents and associated guest policy in image and symbol format for easy recognition.

3. The method of claim 1, further comprising identifying the user by scanning a boarding pass or loyalty membership card of the user.

4. The method of claim 3, further comprising determining whether the boarding pass and/or similar document grants access to the lounge.

5. The method of claim 4, further comprising monitoring the occupancy of the lounge.

6. The method of claim 5, further comprising monitoring flight information.

* * * * *